United States Patent [19]
Cardoso

[11] Patent Number: 5,581,231
[45] Date of Patent: Dec. 3, 1996

[54] ANTI-THEFT PROTECTION SYSTEM

[76] Inventor: Gersio G. Cardoso, Rua S-4,265, Apt. 401,, 74823-450 Goiania-Go, Brazil

[21] Appl. No.: 274,464

[22] Filed: Jul. 13, 1994

[30] Foreign Application Priority Data

Jan. 11, 1994 [BR] Brazil ................................. 9400174-0

[51] Int. Cl.$^6$ ................................................. B60R 25/00
[52] U.S. Cl. .......................... 340/426; 340/428; 340/455; 307/10.2; 307/10.7; 180/287
[58] Field of Search .................................... 340/426, 428, 340/455; 307/10.2, 10.3, 10.6, 10.7; 180/287

[56] References Cited

U.S. PATENT DOCUMENTS

| | | | |
|---|---|---|---|
| 4,740,775 | 4/1988 | Price | 340/426 |
| 5,023,591 | 6/1991 | Edwards | 340/426 |
| 5,170,151 | 12/1992 | Hochstein | 340/455 |
| 5,191,228 | 3/1993 | Sloan | 307/10.3 |
| 5,397,925 | 3/1995 | Carlo et al. | 340/426 |

*Primary Examiner*—Brent A. Swarthout
*Assistant Examiner*—Edward Lefkowitz
*Attorney, Agent, or Firm*—Bachman & LaPointe, P.C.

[57] ABSTRACT

An anti-theft protection system comprises a battery having a series of cells and at least one terminal. The series of cells and the at least one terminal have an electrical connection therebetween, which connection is subject to activation and deactivation. A mechanical contact device is positioned in the battery for physically connecting and disconnecting the series of cells and the at least one terminal for activating and deactivating the electrical connection. At least one of a control unit, an intruder alert system, and a battery load sensor is provided with the system. A control circuit is also provided for controlling the mechanical contact device to cause activation and deactivation of the electrical connection. The control circuit is adapted to receive at least one command signal from at least one of the control unit, the intruder alert system, and the battery load sensor.

17 Claims, 3 Drawing Sheets

ANTI-THEFT PROTECTION SYSTEM

BACKGROUND OF THE INVENTION

The present invention refers to a anti-theft protection system to be used on vehicles, trucks, vessels and alike as well as in any other means that need the use of an electric battery.

More specifically, the present invention refers to an anti-theft system, internally placed to the vehicle engine battery in order to interrupt the electric power supplied by the mentioned battery after the activation of the said system.

Several protective systems for vehicles are known by the practice, whose protective function is in the interruption of the power supplied by the battery.

However, all such systems are external to the battery, therefore being able of localization and nullification by more experienced thieves.

SUMMARY OF THE INVENTION

To solve the problem herein described, a new alarm and anti-theft protection system is proposed, whose major characteristic is its location, that is, inside the battery itself, which prevents the present system from external action.

In this way, the mentioned system initially comprises an electric-mechanic circuit placed under one of the battery terminals, which, when activated, physically interrupts the contact between the said terminal and the series of battery cells.

The physical mobile contact between the battery terminal and the group of cells is done, preferably, by a relay. However, it can also be done by means of a solenoid or by any other means that make possible the shift of an element electrically conductive to electrically connect the external battery terminal to its respective internal contact in the group of cells.

Such circuit is remotely activated by a transmitter of codified signals that, when activated, connects or disconnects the battery external terminal.

Furthermore, the said circuit presents, alternatively, an alarm circuit whose signals are transmitted by sensors internal and/or external to the vehicle. When a suspicious presence is detected, such circuit triggers an external sound source, such as the vehicle horn, or a sound source internal to the battery itself.

The link between the sensors, the external sound source and the circuit is done by a plug placed on the external part of the battery body, next to the circuit place.

Such plug also provides non-interruptible and low current power outputs to electric systems that can not be interrupted, such as clocks and radios (whose station memories depend on external, low-power, power supply).

The present system also comprises a remote signal transmitter that has the function of controlling the activation and deactivation of the protection system. This remote transmitter may be in the form of a radio-frequency transmitter or an infra-red signal that when captured by the respective detector, transfers the information to the battery deactivating circuit.

Furthermore, such control may be in the form of keyboard or magnetic card (and therefore internal to the vehicle). So, its link to the circuit may be by radio frequency or directly by electric cable.

Finally, it is known that shield-type batteries have an anti-explosion system in case of overload. Such system comprises a load sensor that when the overload is detected, the protector seal breaks to release the solution. If, on one hand, this system effectively prevents the battery from exploding, it completely destroys the battery when activated.

In order to prevent this battery impairment, the present invention also comprises an additional sensor, that can be a thermal, pressure, level or voltage sensor that when a lower load, but close to the rupture of the protection seals is detected, the physical contact between the terminal and the group of cells is interrupted to allow a decrease in battery load, preventing unrecoverable damage.

Besides the effect of the normal load loss, the normalization of the battery load occurs by the low voltage output that feeds the clock and radio memories, that are not interrupted by the activation of the protection system.

BRIEF DESCRIPTION OF THE DRAWINGS

The object of the present invention will be better understood with the attached figures, simply brought as an illustrating element and not limiting the invention, where.

DETAILED DESCRIPTION OF THE INVENTION

Figure 1:
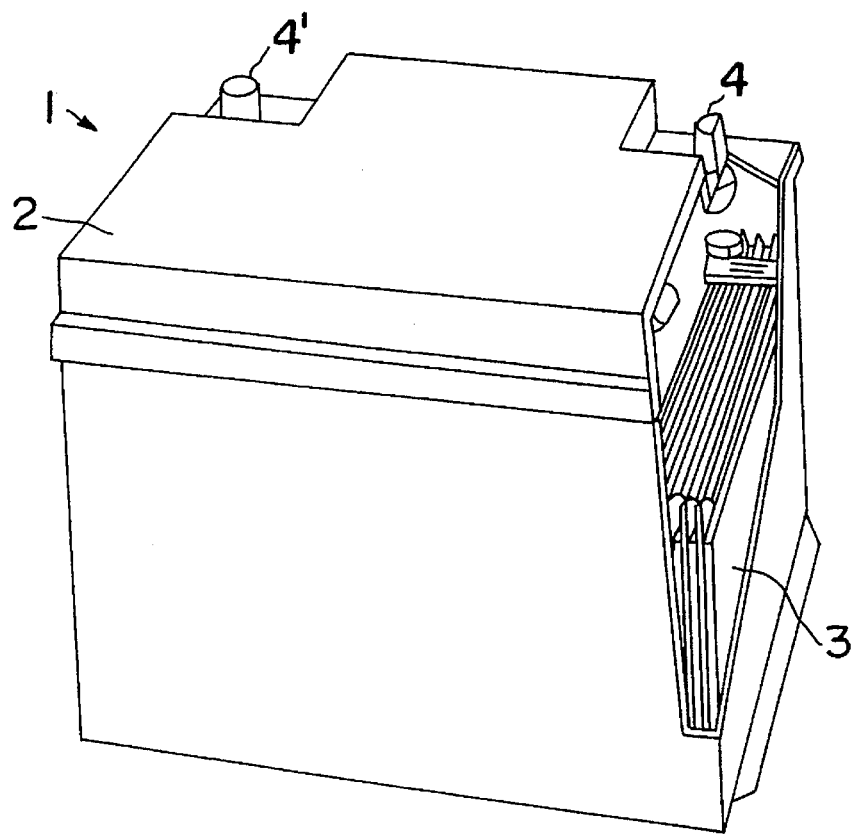
FIG. 1 is a perspective overview, partially sectioned, of a shield-type battery where the terminal of one of the poles is interrupted for the installation of the protection system, object of the present invention.
Figure 3:
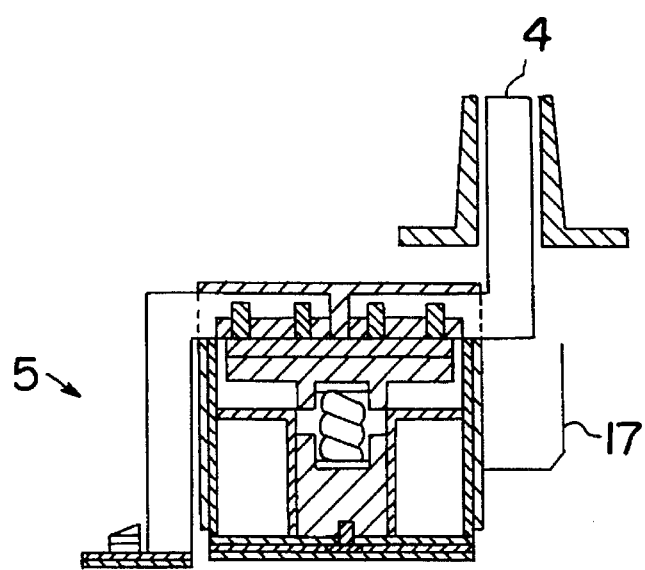
FIG. 3 is an schematic view of the relay used in the present protection system.

According to the attached figures, it is generically shown a battery 1, in this case of the shield-type, that has a cap 2 and internal cells 3. On top, and projecting through the cap 2 are placed two electric terminals 4, 4' to power supply.

As for the present invention, one of the terminals 4 is interrupted in order to place the intermediary contact elements 5 such as a relay or a solenoid.

Since it is preferred to use a relay 5 as a mean of contact, this description will refer exclusively to this element, being, however, understood that this is just a matter of preference and not a limitation.

Figure 4:
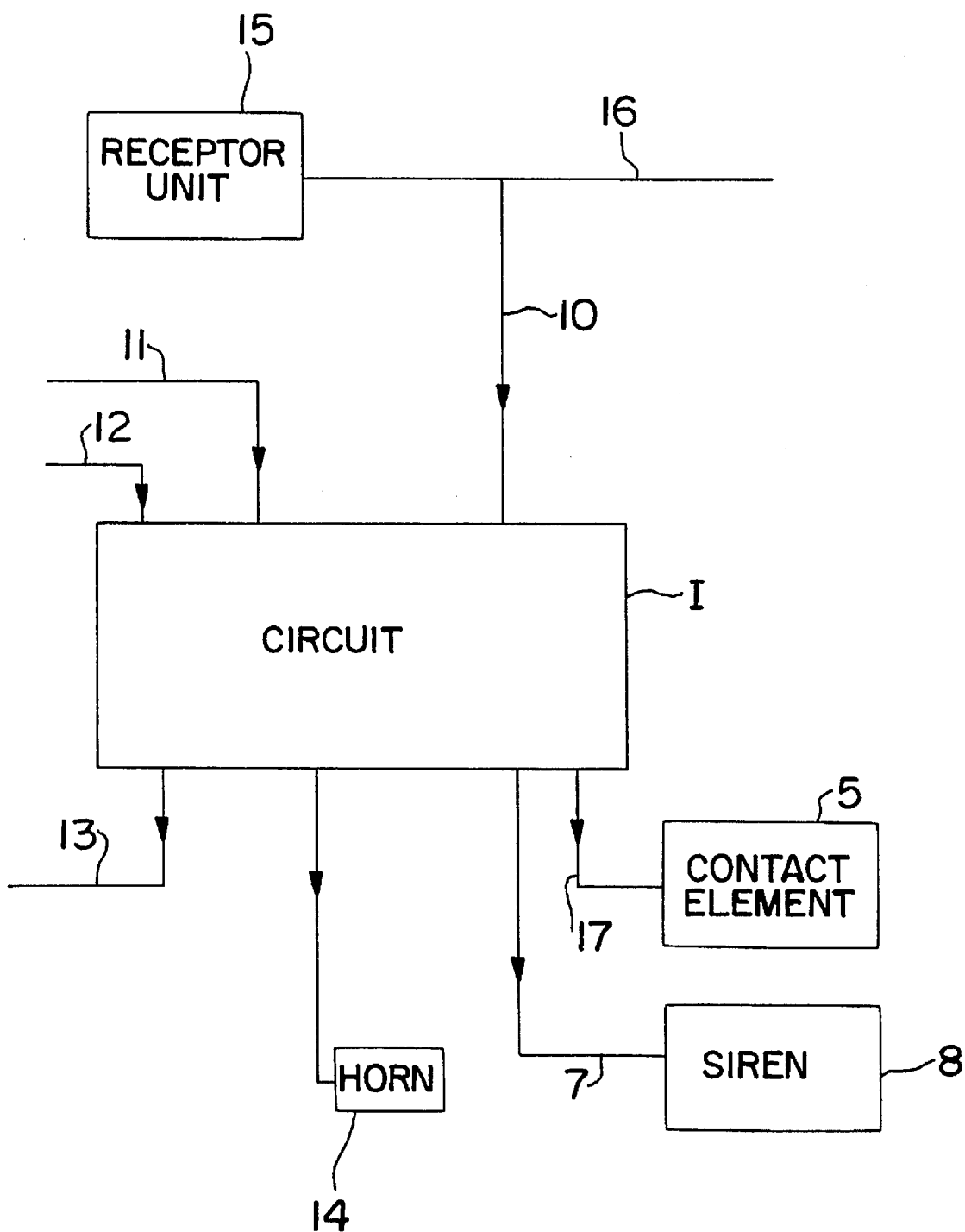
FIG. 4 is a block diagram showing the interconnections of the protection circuit of this invention.

Such relay 5 is electrically controlled by a circuit I (see FIG. 4), that due to a series of signals received via line 17, controls the opening and closing of the battery terminal 4, that is, non-actuating battery and actuating battery, respectively.

Figure 2:
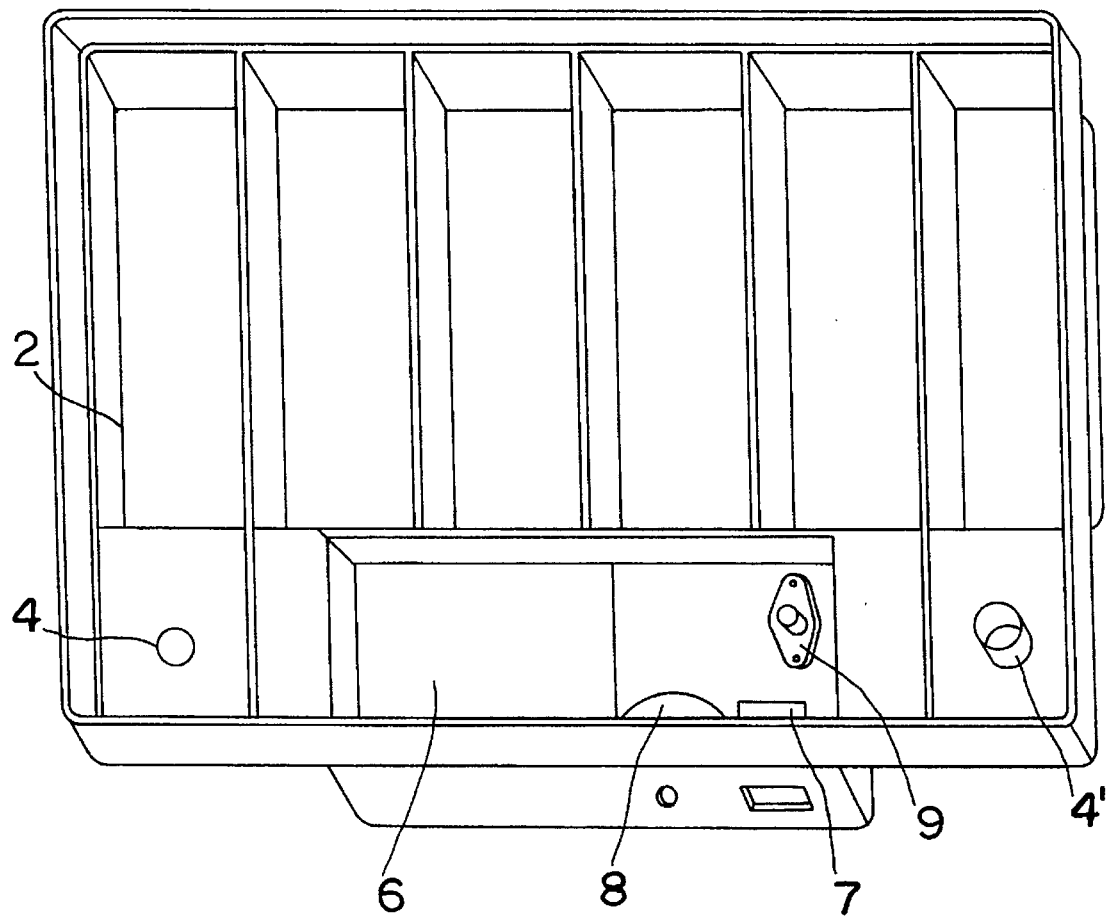
FIG. 2 is a low-elevation view of the cap of the battery mentioned in FIG. 1, where are indicated the placement of the various elements of the present system.

As it can be seen on FIG. 2, such circuit I is placed under the cap 2, in position 6, tightly closed in order to prevent solution vapor from corroding tracks and components of the said circuit I. Beside the said circuit I are also placed under the cap 2 a plug 7 for the external electric connection of the circuit and, eventually, a siren 8 and sensor elements 9 of the battery load 1. The relay 5 is placed under the interrupted terminal 4 between its projecting external portion and its contact with the cells 3 of the battery 1.

This control circuit I starts operation from three distinct signals, the first coming from the remote control unit of the circuit itself, or from a unit internal to the vehicle. Any of these units acts on the circuit via line 10 activating or deactivating the mentioned circuit, that is, accordingly deactivating or activating the battery 1 through the relay 5 that is controlled by a corresponding electric output 17.

As mentioned, the activation or deactivation of the circuit I can be done by a remote unit (not shown) of known type, acting, preferably, by means of radio frequency or infra-red on the receptor unit 15 that decodes and transfers the signal received via line 10 to the circuit I.

The other form of direct activation or deactivation of the circuit I is by means of a unit internal to the vehicle (not shown) that comprises, preferably, a numeric pad or a magnetic card activator. Such signal is transmitted via line 16 and sent to the circuit (I) also through the line 10.

A second input 11 is provided to receive the signal coming from a conventional anti-theft alarm system that detects the intruders presence, deactivates the battery 1 (if it has not been deactivated by the user) and also activates the internal siren 8 of the battery 1 or the vehicle horn 14.

The third input 12 is connected to the load sensor 9 that deactivates the battery 1 in case of overload in order to prevent damages, as already explained.

Finally, the circuit I has command signals output acting initially on the relay 5, via line 17 to deactivate or activate the battery 1 and to activate the internal siren 8 or the vehicle horn 14. Besides this three command output, it is provided a low-voltage output 13 that can keep the permanent connection of low-voltage input for radio memories and clocks of the vehicle, as well as to feed a possible conventional alarm system, as above mentioned.

Therefore, by using such an alarm system, one can deactivate the vehicle battery avoiding a possible theft.

What is claimed is:

1. An anti-theft protection system, comprising:
   a battery having a series of cells and at least one terminal, wherein said series of cells and said at least one terminal have an electrical connection therebetween, which connection is subject to activation and deactivation;
   mechanical contact means positioned inside said battery for physically connecting and disconnecting said series of cells and said at least one terminal for activating and deactivating said electrical connection;
   at least one of a control unit, an intruder alert system, and a means for sensing battery load; and
   a control circuit means for controlling said mechanical contact means to cause said activation and deactivation of said electrical connection,
   wherein said control circuit means is adapted to receive at least one command signal from at least one of said control unit, said intruder alert system, and said means for sensing battery load.

2. The system according to claim 1, wherein said battery includes a cap and at least one plug positioned under said cap for connection of externally originating inputs including at least one of an alarm, said intruder alert system, and said means for sensing battery load with said circuit means.

3. The system according to claim 1, wherein said means for sensing battery load provides said at least one command signal and comprises at least one of a thermal sensor, pressure sensor and a voltage level sensor.

4. The system according to claim 1, wherein said control circuit further includes at least one input for receiving said at least one command signal from at least one of said control unit, said intruder alert system, and said means for sensing battery load.

5. The system according to claim 1, wherein said command signal is received from said control unit and wherein said control unit is a remote control unit in the form of a radio frequency transmitter of infrared signals, said control circuit including a receptor and a decoding unit for receiving said infrared signals.

6. The system according to claim 1, wherein said control unit is an internal control unit.

7. The system according to claim 6, wherein said internal control unit is comprised of a magnetic card activator.

8. The system according to claim 1, wherein said control circuit includes a main command output means for outputting a signal to said mechanical contact means for causing said activation and deactivation of said electrical connection.

9. The system according to claim 8, further including an additional command output means for outputting signals to at least one of an alarm positioned in an internal area of said battery and to an alarm positioned external to said battery.

10. The system according to claim 9, wherein said alarm positioned external to said battery is a horn and said alarm positioned in said internal area is a siren.

11. The system according to claim 1, wherein said control circuit includes a constant output means for maintaining a permanent electrical connection with low voltage loads which depend on said permanent connection for maintaining accuracy, said constant output means preventing said low voltage loads from being electrically disconnected from said battery by said deactivation of said mechanical contact means via said control circuit means.

12. The system according to claim 11, wherein said low voltage loads include a load from said intruder alert system.

13. The system according to claim 1, wherein said mechanical contact means comprises one of a relay or a solenoid.

14. The system according to claim 13, wherein one of said relay or said solenoid is physically positioned between at least one of said series of cells and said at least one terminal for electrically connecting said at least one of said series of cells and said at least one terminal.

15. The system according to claim 1, wherein said means for sensing battery load comprises means for preventing said battery from exploding due to an overload on said battery.

16. The system according to claim 15, wherein means for preventing comprises a sensor for detecting when an excessive amount of current is supplied to said battery.

17. The system according to claim 1, wherein said control circuit means is positioned in said battery.

* * * * *